United States Patent
Niwa et al.

(10) Patent No.: US 11,168,655 B2
(45) Date of Patent: Nov. 9, 2021

(54) FUEL FILTER DEVICE

(71) Applicant: AISAN KOGYO KABUSHIKI KAISHA, Obu (JP)

(72) Inventors: Kensuke Niwa, Nagoya (JP); Koji Yoshida, Kasugai (JP); Tatsuki Fukui, Novi, MI (US); Hiroyasu Kariya, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 15/523,556

(22) PCT Filed: Sep. 10, 2015

(86) PCT No.: PCT/JP2015/075709
§ 371 (c)(1),
(2) Date: May 1, 2017

(87) PCT Pub. No.: WO2016/072153
PCT Pub. Date: May 12, 2016

(65) Prior Publication Data
US 2017/0304749 A1    Oct. 26, 2017

(30) Foreign Application Priority Data
Nov. 7, 2014  (JP) .............................. JP2014-226903

(51) Int. Cl.
*F02M 37/50*  (2019.01)
*F16K 15/06*  (2006.01)
(Continued)

(52) U.S. Cl.
CPC ............. *F02M 37/50* (2019.01); *B01D 27/06* (2013.01); *B01D 27/08* (2013.01);
(Continued)

(58) Field of Classification Search
None
See application file for complete search history.

(56) References Cited

U.S. PATENT DOCUMENTS 4,503,885 A * 3/1985 Hall ..................... B60K 15/077
                                                                  123/514
4,807,582 A * 2/1989 Tuckey ................ B60K 15/077
                                                                  123/514
(Continued)

FOREIGN PATENT DOCUMENTS

JP  S63-183392 U  11/1988
JP  H04-127475 U  11/1992
(Continued)

OTHER PUBLICATIONS

Japanese Office Action dated Nov. 7, 2017, for Japanese Application No. 2014-226903 (5 p.).
(Continued)

*Primary Examiner* — Robert J Popovics
(74) *Attorney, Agent, or Firm* — Conley Rose, P.C.

(57) ABSTRACT

A fuel filter device includes a bag-shaped filter member filtering fuel that is drawn into a fuel pump, an inner frame member retaining the filter member in an expanded state, and a mounting member connected to the inner frame member and serving to communicate an internal space of the filter member with an outside. A valve chamber is defined by the inner frame member and the mounting member, and a check valve serving to prevent backflow of fuel is disposed in the valve chamber. The check valve includes a flat-plate shaped valve body having elasticity. The check valve opens against its weight when the fuel pump is operated, and the check valve closes due to its weight when the operation of the fuel pump is stopped.

7 Claims, 3 Drawing Sheets

(51) Int. Cl.
*F02M 37/00* (2006.01)
*F02M 37/10* (2006.01)
*F16K 17/12* (2006.01)
*B01D 35/153* (2006.01)
*B01D 35/027* (2006.01)
*F02M 37/46* (2019.01)
*F02M 37/48* (2019.01)
*B01D 27/06* (2006.01)
*B01D 27/08* (2006.01)
*B01D 35/143* (2006.01)
*B01D 35/30* (2006.01)
*B01D 36/00* (2006.01)
*B01D 35/00* (2006.01)
*B01D 37/00* (2006.01)

(52) U.S. Cl.
CPC ....... *B01D 35/0273* (2013.01); *B01D 35/143* (2013.01); *B01D 35/153* (2013.01); *B01D 35/306* (2013.01); *B01D 36/005* (2013.01); *F02M 37/00* (2013.01); *F02M 37/10* (2013.01); *F02M 37/46* (2019.01); *F02M 37/48* (2019.01); *F16K 15/06* (2013.01); *F16K 17/12* (2013.01); *B01D 35/00* (2013.01); *B01D 37/00* (2013.01); *B01D 2201/0423* (2013.01)

(56) References Cited

U.S. PATENT DOCUMENTS

| | | | | |
|---|---|---|---|---|
| 4,860,714 A | * | 8/1989 | Bucci | F02M 37/0052 123/514 |
| 4,966,522 A | * | 10/1990 | Koyama | F02M 37/50 415/121.2 |
| 4,974,570 A | * | 12/1990 | Szwargulski | B01D 35/0273 123/509 |
| 4,989,572 A | * | 2/1991 | Giacomazzi | F02M 37/0035 123/509 |
| 5,049,271 A | * | 9/1991 | Cain | F02M 37/50 210/250 |
| 5,070,849 A | * | 12/1991 | Rich | F02M 37/106 123/509 |
| 5,170,764 A | * | 12/1992 | Tuckey | F02M 37/106 123/509 |
| 5,195,494 A | * | 3/1993 | Tuckey | F02M 37/0029 123/514 |
| 5,218,942 A | * | 6/1993 | Coha | F02M 37/106 123/509 |
| 5,330,475 A | * | 7/1994 | Woodward | F02M 37/106 123/509 |
| 5,415,146 A | * | 5/1995 | Tuckey | B01D 35/0273 123/509 |
| 5,547,568 A | * | 8/1996 | Sasaki | B01D 29/15 210/172.4 |
| 5,607,578 A | * | 3/1997 | Ohkouchi | B01D 35/027 210/172.4 |
| 5,613,476 A | * | 3/1997 | Oi | B01D 35/0273 123/509 |
| 5,639,367 A | * | 6/1997 | Ohzeki | F02M 37/10 210/315 |
| 5,647,329 A | * | 7/1997 | Bucci | B01D 35/0273 123/509 |
| 5,665,229 A | * | 9/1997 | Fitzpatrick | B01D 35/027 210/232 |
| 5,716,522 A | * | 2/1998 | Chilton | B01D 29/111 210/317 |
| 5,776,341 A | * | 7/1998 | Barnard | B01D 29/114 210/306 |
| 5,795,468 A | * | 8/1998 | Reising | B01D 29/15 210/172.4 |
| 5,902,480 A | * | 5/1999 | Chilton | F02M 37/50 210/317 |
| 6,360,766 B1 | | 3/2002 | Sawert et al. | |
| 6,451,205 B1 | * | 9/2002 | McGaw, Jr. | B29C 65/08 156/73.3 |
| 6,471,072 B1 | * | 10/2002 | Rickle | F02M 37/50 210/486 |
| 6,640,789 B2 | * | 11/2003 | Gabauer | F02M 37/025 123/509 |
| 6,821,422 B1 | * | 11/2004 | Brzozowski | F02M 37/50 210/416.4 |
| 6,923,164 B1 | * | 8/2005 | Mitsudou | F02M 37/103 123/509 |
| 7,029,582 B2 | * | 4/2006 | Sato | F02M 37/42 210/232 |
| 7,083,722 B2 | * | 8/2006 | McGaw, Jr. | B29C 65/08 210/167.02 |
| 7,279,095 B2 | * | 10/2007 | Usui | B01D 35/0273 210/232 |
| 7,329,339 B2 | * | 2/2008 | Kimisawa | B01D 29/15 210/136 |
| 7,478,729 B2 | * | 1/2009 | Sato | F02M 37/50 210/491 |
| 7,546,833 B2 | * | 6/2009 | Tomomatsu | F02M 37/50 123/509 |
| 7,628,143 B2 | * | 12/2009 | Yamada | F02M 37/106 123/509 |
| 7,901,572 B2 | * | 3/2011 | Sato | B01D 39/1623 210/172.4 |
| 7,964,096 B2 | * | 6/2011 | Kimisawa | F02M 37/025 210/172.4 |
| 8,137,546 B2 | * | 3/2012 | Ogose | B01D 39/1623 210/172.4 |
| 8,173,013 B2 | * | 5/2012 | Sato | F02M 37/50 210/172.4 |
| D667,923 S | * | 9/2012 | Ueki | D23/209 |
| 8,372,278 B1 | * | 2/2013 | Nguyen | B01D 35/0273 210/172.2 |
| 8,453,622 B2 | * | 6/2013 | Iwaoka | F02M 37/0017 123/509 |
| 8,715,497 B2 | * | 5/2014 | Schnipke | B01D 35/0273 210/172.2 |
| 8,936,008 B2 | * | 1/2015 | Powell | F02M 37/103 123/495 |
| 9,132,366 B2 | * | 9/2015 | Ueki | F02M 37/44 |
| 9,470,193 B2 | * | 10/2016 | Ries | B01D 35/0276 |
| 9,486,725 B2 | * | 11/2016 | Ries | B01D 29/117 |
| 9,816,470 B2 | * | 11/2017 | Nishio | F02M 37/10 |
| 10,024,283 B2 | * | 7/2018 | Ishitoya | B01D 35/0273 |
| 10,145,341 B2 | * | 12/2018 | Kim | F02M 37/14 |
| 10,267,276 B2 | * | 4/2019 | Nishio | F02M 37/50 |
| 10,436,161 B2 | * | 10/2019 | Kim | F02M 37/14 |
| 10,690,096 B2 | * | 6/2020 | Hayashi | F02B 37/025 |
| 10,753,329 B2 | * | 8/2020 | Hayashi | B01D 29/13 |
| 11,073,118 B2 | * | 7/2021 | Ito | F02M 37/10 |
| 2005/0029173 A1 | * | 2/2005 | Kimisawa | B01D 29/15 210/136 |
| 2005/0286103 A1 | * | 12/2005 | Yu | F02M 37/106 123/509 |
| 2006/0076287 A1 | * | 4/2006 | Catlin | B01D 35/0273 210/416.4 |
| 2007/0181102 A1 | * | 8/2007 | Hazama | B01D 35/027 123/514 |
| 2007/0199546 A1 | * | 8/2007 | Tomomatsu | F02M 37/106 123/509 |
| 2008/0196780 A1 | * | 8/2008 | Tipton | F02M 37/10 137/861 |
| 2009/0025690 A1 | * | 1/2009 | Yamada | F02M 37/50 123/509 |
| 2013/0284662 A1 | * | 10/2013 | Ueki | F02M 37/50 210/455 |
| 2017/0304749 A1 | * | 10/2017 | Niwa | F02M 37/46 |
| 2017/0314521 A1 | * | 11/2017 | Niwa | F02M 37/106 |
| 2019/0170097 A1 | * | 6/2019 | Hayashi | F02M 37/10 |

FOREIGN PATENT DOCUMENTS

| | | | |
|---|---|---|---|
| JP | 06-185645 A | | 7/1994 |
| JP | H10-61517 A | | 3/1998 |

(56) References Cited

FOREIGN PATENT DOCUMENTS

| | | |
|---|---|---|
| JP | 2009-047156 A | 3/2009 |
| JP | 2009-257152 A | 11/2009 |
| JP | 2011-153600 A | 8/2011 |
| JP | 2012-087719 A | 5/2012 |
| JP | 2012110860 A | 6/2012 |

OTHER PUBLICATIONS

English Translation of Japanese Office Action dated Nov. 7, 2017, for Japanese Application No. 2014-226903 (4 p.).
International Patent Application No. PCT/JP2015/075709 International Search Report dated Dec. 1, 2015 (5 pages).

* cited by examiner

FUEL FILTER DEVICE

CROSS-REFERENCE TO RELATED APPLICATIONS

The present application is a National Phase entry of, and claims priority to, PCT Application No. PCT/JP2015/075709, filed Sep. 10, 2015, which claims priority to Japanese Patent Application No. 2014-226903, filed Nov. 7, 2014, both of which are incorporated herein by reference in their entireties.

STATEMENT REGARDING FEDERALLY SPONSORED RESEARCH OR DEVELOPMENT

Not applicable.

BACKGROUND

The present disclosure relates to a fuel filter device installed within a fuel tank mainly used in vehicles, such as an automobile or a motorcycle.

Conventionally, for example, Japanese Laid-Open Patent Publication No. 10-61517 discloses a fuel pump of an in-tank type, in which a check valve is disposed at a location in a pipe conduit where fuel, which has been drawn from a fuel filter, is introduced to the fuel pump. With this arrangement, backflow of the fuel from the fuel pump to the fuel filter device is prevented because the check valve closes when the operation of the fuel pump is stopped. Therefore, even in the case where the amount of fuel within the fuel tank has become small, it is possible to quickly raise the discharge pressure of the fuel pump when an internal combustion engine is restarted.

BRIEF SUMMARY

However, in the case of the conventional fuel filter device, the check valve is disposed at a location in the pipe conduit where the fuel filter connects to the fuel pump, and therefore, it is necessary to disrupt the pipe conduit, so that the number of components may increase, causing a problem of difficulty for ensuring an arrangement space for the check valve. There has been a need in the art to provide a fuel filter device that enables to easily ensure an arrangement space of a check valve without increasing the number of components.

According to a first aspect of the present disclosure, there is provided a fuel filter device comprising a bag-shaped filter member filtering fuel that is drawn into a fuel pump, an inner frame member retaining the filter member in an expanded state, and a pipe member connected to the inner frame member and serving to communicate an internal space of the filter member with an outside, wherein a valve chamber is defined by the inner frame member and the pipe member, and a check valve serving to prevent backflow of fuel is disposed in the valve chamber. With this construction, because the valve chamber is defined by the inner frame member and the pipe member, it is possible to easily ensure an arrangement space for the check valve without increasing the number of components.

According to a second aspect of the present disclosure, the check valve comprises a flat-plate shaped valve body having elasticity, the check valve opens against its own weight when the fuel pump is operated, and the check valve closes due to its own weight when the operation of the fuel pump is stopped. With this construction, because the valve body has the flat-plate shaped valve body, it is possible to provide a fuel passage area that is larger than that in the case of a valve body of a ball valve or the like, so that it is possible to reduce a loss in pressure. Further, it is possible to reduce an arrangement space in the vertical direction for the valve body.

According to a third aspect of the present disclosure, the check valve comprises a guide member having rigidity; and the guide member comprises a guide shaft portion vertically movably inserted into a guide tube disposed at a central region within the pipe member, and a deformation restricting portion formed on the guide shaft portion to have a flange shape and serving to restrict deformation of the valve body in an upward direction. With this construction, because the guide shaft portion of the guide member moves vertically along the inside of the guide tube of the pipe member, the valve body can open and close while being maintained in a horizontal state. Further, the deformation restricting portion of the guide member can restrict the deformation of the valve body in the upward direction. This may improve the sealing performance of the valve body at the time of closing.

DETAILED DESCRIPTION

Figure 1:
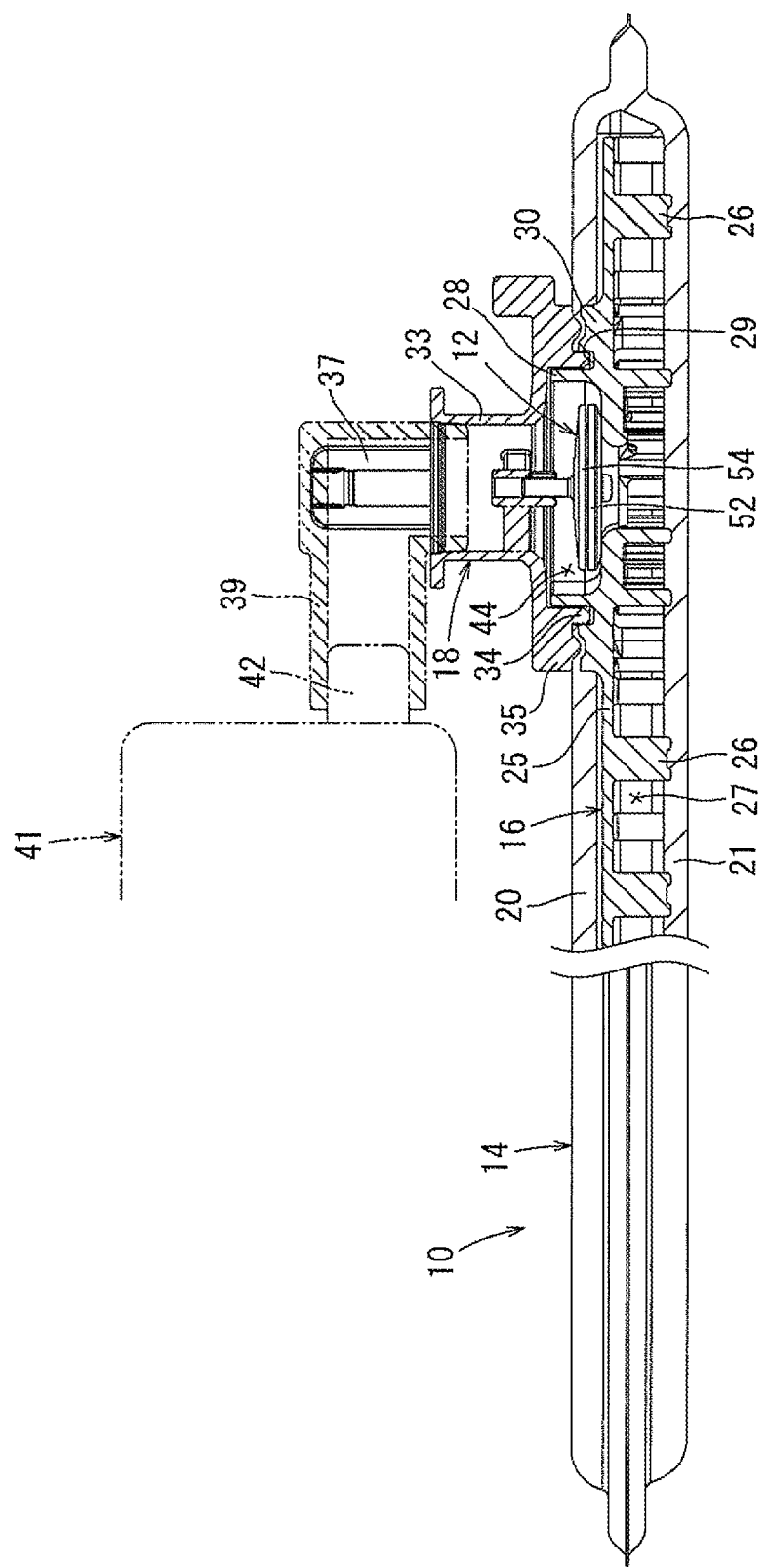
FIG. 1 is a side view showing a fuel filter device according to an embodiment of the present disclosure in a broken partial view.
Figure 2:
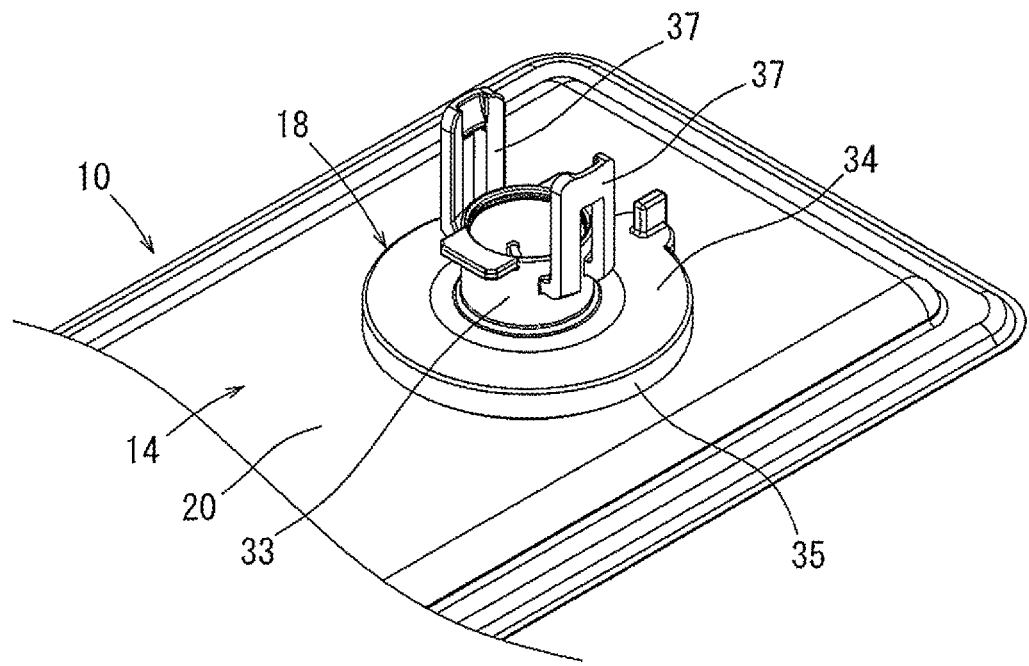
FIG. 2 is a perspective view showing a peripheral portion of a mounting member of the fuel filter device.

An embodiment will now be described with reference to the drawings. FIG. 1 is a side view showing a fuel filter device in a broken partial view, and FIG. 2 is a perspective view showing a peripheral portion of a mounting member of the fuel filter device. As shown in FIG. 1, a check valve 12 is assembled within a fuel filter device 10 for preventing backflow of fuel. Therefore, the check valve 12 will be described after making a brief explanation about the fuel filter device 10.

The fuel filter device 10 comprises a filter member 14, an inner frame member 16 and a mounting member 18. The filter member 14 is formed to have a flat bag-shape including an upper filter material 20 and a lower filter material 21 that are made of resin. The peripheral portions of both filter materials 20 and 21 are joined to each other over the entirety of the circumferences by welding, etc. Both filter materials 20 and 21 are made of sheet-shaped materials each having a function of allowing passage of fuel while removing foreign materials contained in the fuel. Here, the filter member 14 may be formed by folding a single sheet of filter material made of resin in half, and then sealingly joining their peripheral portions other than the folded portion by welding or any other means. A circular fitting hole 23 is formed in the upper filter material 20 (see FIG. 2).

The inner frame member 16 is made of resin and includes a lattice plate-shaped frame body 25 and a plurality of leg portions 26 dispersedly protruding downward from the frame body 25. The inner frame member 16 is disposed within an internal space 27 of the filter member 14. The inner frame member 16 keeps the filter member 14 in an expanded state or keeps a distance between the filter materials 20 and 21. A connection tube portion 28 having a cylindrical tubular shape is provided on the frame body 25 to protrude therefrom. A circular ring-shaped annular groove 29 surrounding the lower end portion of the connection tubular portion 28 is concentrically formed on the frame body 25. A circular-ring-shaped joint portion 30 surrounding the annular groove 29 is concentrically formed on the frame body 25. A hole edge portion of the fitting hole 23 of the upper filter material 20 is positioned on the upper side of the joint portion 30.

The mounting member 18 is made of resin and is formed to have a cylindrical tubular shape. A fitting tube portion 34 having a cylindrical tubular shape is provided on the lower end portion of a body portion (labeled with reference numeral 33) of the mounting member 18 to protrude therefrom, and a flange-shaped joint portion 35 surrounding the fitting tube portion 34 is concentrically formed on the lower portion of the body portion. With this arrangement, the hole edge portion of the fitting hole 23 of the upper filter material 20 is held between the joint portion 30 of the inner frame member 16 and the joint portion 35 of the mounting member 18. Between the joint portion 30 and the joint portion 35, there is formed a holding means that comprises an annular convex portion and an annular concave portion capable of being fitted with each other to hold the hole edge portion of the fitting hole 23 of the upper filter material 20. Further, the inner frame member 16 and the mounting member 18 are sealingly joined to each other over their entire circumferences by welding or any other means. In this way, the mounting member 18 is joined to the inner frame member 16, and the internal space 27 of the filter member 14 communicates with the outside. Here, the mounting member 18 corresponds to a "tubular member" in this description. Further, when the inner frame member 16 and the mounting member 18 are welded to each other, it may be possible to weld the hole edge portion of the fitting hole 23 of the upper filter material 20 to the members 16 and 18 so as to be integrated therewith.

A pair of attaching pieces 37 (see FIG. 2) are formed on the upper end portion of the body portion 33. Both attaching pieces 37 are capable of being attached to an elbow-shaped connecting member 39 by snap-fitting or any other means. The connecting member 39 is arranged on the side of the fuel pump 41 and is connected to a fuel inlet port 42 of a fuel pump 41. Therefore, the mounting member 18 is connected to the connecting member 39 as it is attached to the connecting member 39 via both attaching pieces 37. However, the mounting member 18 and the fuel inlet port 42 of the fuel pump 41 may also be connected to each other without intervention of the connecting member 39. In addition, although the fuel pump 41 is arranged in a horizontally oriented state in FIG. 1, it may be arranged in a vertically oriented state.

The fuel filter device 10 is arranged in a horizontal state at the bottom portion within a fuel tank (not shown) and filtrates fuel, i.e., captures foreign materials of the fuel, that is stored within the fuel tank and is drawn by the fuel pump 41, through the filter member 14. Via the mounting member 18 and the connecting member 39, the fuel pump 41 draws the fuel that has been drawn via the filter member 14 of the fuel filter device 10, and the fuel pump 41 increases the pressure of the drawn fuel and supplies it to an internal combustion engine (not shown). If the fuel within the fuel tank is reduced to a small amount, the fuel within a pump chamber of the fuel pump 41 may flow backwards when the operation of the fuel pump 41 is stopped. This may result in extra time needed for raising the discharge pressure of the fuel pump 41 when the internal combustion engine is restarted. For this reason, a check valve 12 is assembled with the fuel filter device 10 for preventing the backflow of the fuel.

Figure 3:
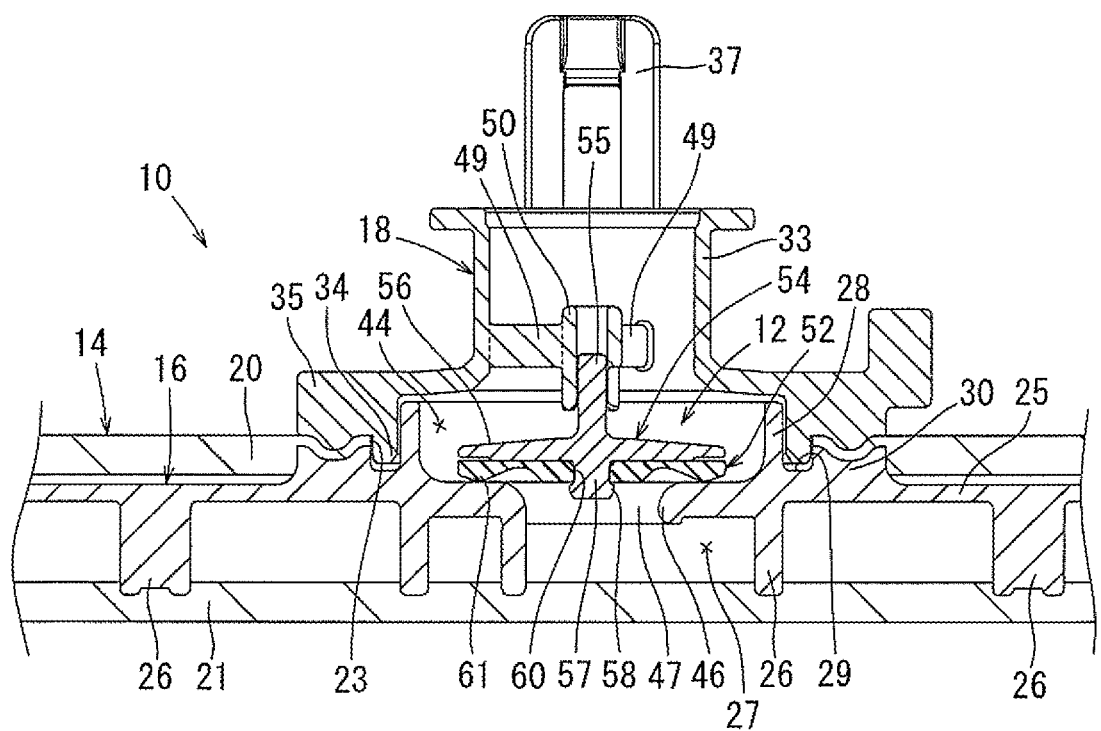
FIG. 3 is a sectional view showing a closed state of a check valve.
Figure 4:
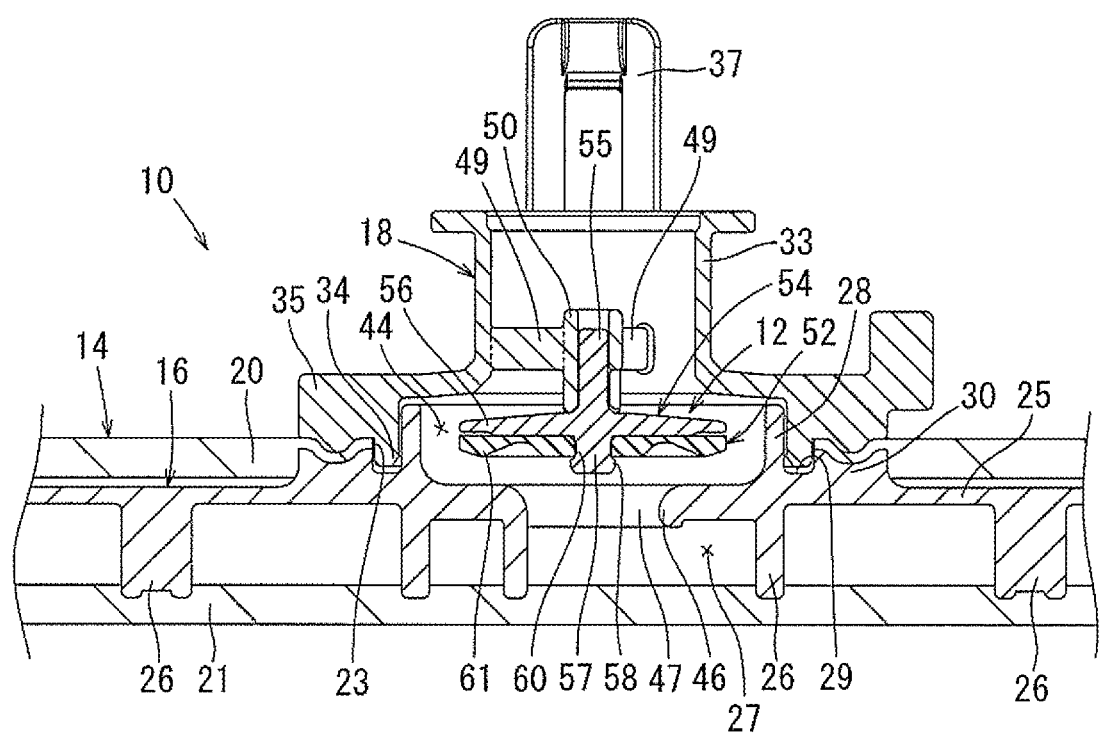
FIG. 4 is a sectional view showing an opened state of the check valve.

Next, the structure of the check valve 12 and a structure related to the check valve 12 will be described. FIG. 3 is a sectional view showing a closed state of the check valve, and FIG. 4 is a sectional view showing an opened state of the check valve. As shown in FIG. 3, a valve chamber 44 is defined by the inner frame member 16 and the mounting member 18. More specifically, the valve chamber 44 having a hollow cylindrical shape with an increased inner diameter is defined in a connection region between the inner frame member 16 and the mounting member 18. In this connection, the diameters of the connection tube portion 28, the annular groove 29 and the joint portion 30 of the inner frame member 16, as well as the diameters of the fitting tube portion 34 and the joint portion 35 of the mounting member 18, are all increased in comparison with the case where no check valve 12 is assembled. If no check valve 12 is assembled, the fitting tube portion 34 of the mounting member 18 may be formed to have the same or substantially the same inner diameter as the body portion 33. In this connection, the joint portion 35 of the mounting member 18 and the connecting tube portion 28, the annular groove 29 and the joint portion 30 of the inner frame member 16 may be formed to have diameters that correspond to the diameter of the fitting tube portion 34.

A valve seat portion 46 having a valve hole 47 is formed on the inner frame member 16. The valve seat portion 46 corresponds to a bottom wall portion of the valve chamber 44. The valve seat portion 46 and the valve hole 47 are formed concentrically with the connection tube portion 28. The valve hole 47 allows communication between the internal space 27 of the filter member 14 and the valve chamber 44.

The body portion 33 and the fitting tube portion 34 of the mounting member 18 are formed into a stepped cylindrical shape. A plurality (e.g., three, while two are shown in FIG. 3) of connecting arm portions 49 are formed within the lower end portion in a radially extending manner. A hollow cylindrical tubular guide tube 50 is formed at a location where the plurality of connecting arm portions 49 intersect with each other. The guide tube 50 is formed to be coaxial with the body portion 33.

The check valve 12 is arranged within the valve chamber 44 so as to be movable in the axial, or vertical, direction. The check valve 12 is constituted of a valve body 52 and a guide member 54. The guide member 54 is a rigid member formed of resin and includes a guide shaft portion 55, a flange portion 56 and a mount shaft portion 57 that are concentrical with each other. The guide shaft portion 55 is formed in a cylindrical column shape. The guide shaft portion 55 is inserted into the guide tube 50 of the mounting member 18 so as to be slidably movable in the axial direction (vertical direction). The flange portion 56 extends radially outward from the lower end portion of the guide shaft portion 55 in a manner like a circular disk. The mount shaft portion 57 is formed on the lower end portion of the guide shaft portion 55 in such a manner it extends vertically downward. An expanded portion 58 is formed on the lower end portion of the mount shaft portion 57 so as to be smoothly connected to the lower end portion and to have a shaft diameter larger than the same.

The valve body 52 is formed of rubber or similar elastic material with elasticity in a flat-plate shape or a circular disk shape. A circular mounting hole 60 is formed in the central portion of the valve body 52. The valve body 52 has an upper surface formed as a planer surface perpendicular to an axis of the valve body 52. The hole edge portion of the mounting hole 60 is of increased thickness. The mounting hole 60 is fitted with the mount shaft portion 57 by passing the expanded portion 58 of the guide member 54 through the mounting hole 60 by utilizing the elastic deformation of the hole edge portion. Therefore, the valve body 52 closely contacts the lower surface of the flange portion 56 of the guide member 54. The expanded portion 58 of the mount shaft portion 57 serves to prevent removal of the valve body 52. The valve body 52 has an outer diameter that is the same or substantially the same as the outer diameter of the flange portion 56. An annular seal portion 61 protrudes from the outer peripheral portion of the lower surface of the valve body 52. The valve body 52 moves in unison with the guide member 54 so as to be seated on or spaced apart from the valve seat portion 46 of the inner frame member 16. The flange 56 serves to restrict the deformation of the valve body 52 in the upward direction. Here, the flange portion 56 corresponds to a "deformation restricting portion" according to the present description.

As for the check valve 12, the check valve 12 closes by its own weight when the operation of the fuel pump 41 (see FIG. 1) is stopped. Thus, the valve body 52 is seated on the valve seat portion 46 to close the valve hole 47. Then, the seal portion 61 of the valve body 52 elastically closely contacts the valve seat portion 46. This prevents the backflow of the fuel from the fuel pump 41 to the fuel filter device 10 when the operation of the fuel pump 41 is stopped.

Further, when the fuel pump 41 is operated, the check valve 12 opens against its own weight due to the flow of the fuel drawn into the fuel pump 41 (see FIG. 4). Thus, the valve body 52 is separated from the valve seat portion 46 to open the valve hole 47. Then, the flange portion 56 of the guide member 54 contacts the guide tube 50 of the mounting member 18 to prevent further movement of the check valve 12.

According to the fuel filter device 10 described above, the valve chamber 14 is defined by the inner frame member 16 and the mounting member 18, and therefore, it is possible to easily ensure an arrangement space for the check valve 12 without increasing the number of components.

Further, because the valve body 52 has a flat-plate shape, it is possible to provide a fuel passage area that is larger than the case where the valve body 52 is a ball valve or the like, whereby it is possible to reduce a loss in pressure. Further, it is possible to reduce an arrangement space in the vertical direction for the valve body 52.

Further, because the guide shaft portion 55 moves vertically along the inside of the guide tube 50 of the mounting member 18, the valve body 52 is able to open and close while being maintained in the horizontal state. Further, the flange portion 56 of the guide member 54 can restrict the deformation of the valve body 52 in the upward direction. This may improve the sealing performance of the valve body 52 at the time of closing.

The present disclosure may not be limited to the above embodiment but may be modified. For example, any kind of check valve may be used as long as it can prevent backflow of fuel, and the check valve may be a ball valve, an umbrella valve, etc. Further, the valve body 52 and the guide member 54 of the check valve 12 may be adhered to each other. Further, the check valve 12 may be integrally molded using rubber or like elastic material.

The invention claimed is:

1. A fuel filter device comprising:
   a bag-shaped filter member for filtering fuel that is drawn into a fuel pump, wherein the bag-shaped filter member has an internal space;
   an inner frame member disposed in the internal space of the bag-shaped filter member for retaining the filter member in an expanded state, wherein the inner frame member forms an annular valve seat, wherein the inner frame member also comprises an elevated cylindrical flange extending radially outward from the annular valve seat in a one-piece construction with the inner frame member, and wherein the inner frame member also comprises a circular fitting groove located radially outward from and adjacent to the cylindrical flange;
   a pipe member comprising a two-tiered cylindrical shape with top and bottom tiers, with the bottom tier extending radially outward from and at approximately 90 degrees relative to the top tier, wherein the pipe member is connectable to the inner frame member via inserting a fitting flange into the circular fitting groove of the inner frame member, forming a complementary fit between the pipe member and the inner frame member, wherein the top tier of said pipe member further comprises a concentric guide tube within its interior, and serves as a conduit for communication between the internal space of the filter member and an outside region through a hole formed in the top tier of the pipe member;
   wherein a valve chamber is jointly defined by the cylindrical flange of the inner frame member and the pipe member which fits radially over top of the cylindrical flange; and
   a check valve serving to prevent backflow of fuel and disposed in the valve chamber.

2. The fuel filter device according to claim 1, wherein the check valve comprises an elastically-deformable valve body as well a guide member, wherein a portion of the valve body is shaped as an annular flat-plate disk shaped flange portion where the guide member protrudes through the flange portion, wherein the valve body and guide member jointly form an annular seal, which is capable of sealing the annular valve seat of the inner frame member.

3. The fuel filter device according to claim 2, wherein the check valve also comprises a guide shaft portion of the guide member, forming a cylindrical columnar shape which is located above the flange portion of the guide member, wherein the guide shaft portion can be into a guide tube located on the pipe member such that it is slidably movable in said tube in the axial vertical direction, wherein the flange portion extends radially outward from the lower end portion of said guide shaft portion.

4. The fuel filter device according to claim 3, wherein the check valve also comprises a mount shaft portion of the guide member, which is located below the flange portion of the guide member, wherein said mount shaft portion forms a cylindrical columnar shape with approximately the same radius as the guide shaft portion, wherein an expanded radially outward-extending knob-like structure is formed on the lower end of the mount shaft portion.

5. The fuel filter device of claim 2, wherein the check valve body is biased due to its own weight and the weight of the guide member such that it seals the annular valve seat of the inner frame member, wherein the direction of said bias is vertically downwards.

6. The fuel filter device of claim 2, wherein the guide member vertically opposes the valve body, and is comprised of a rigid material, such that it serves to restrict the deformation of the valve body in the upward direction.

7. The fuel filter device of claim 2, wherein the top of the pipe member may be fit with an elbow shaped attaching piece formed at a right angle, such that the attaching piece may connect the pipe member to the inlet of a fuel pump.

\* \* \* \* \*